Patented May 29, 1923.

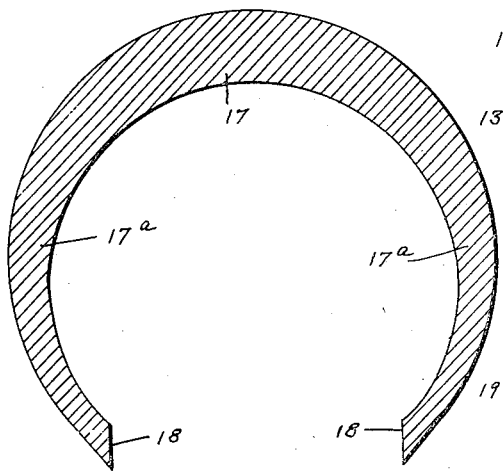
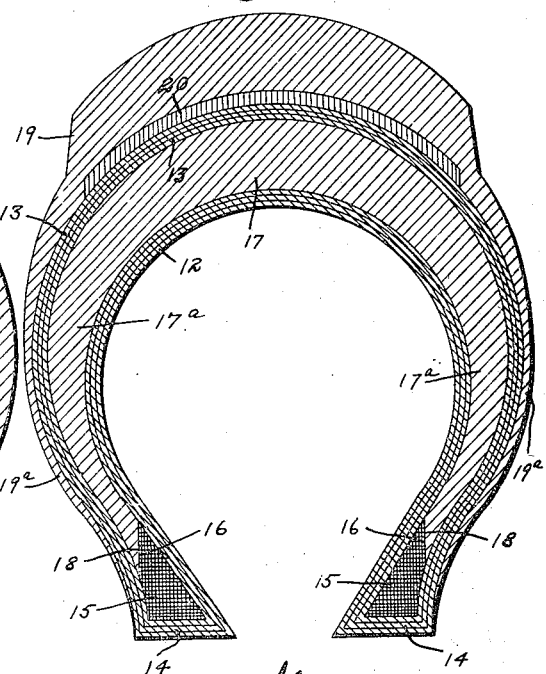
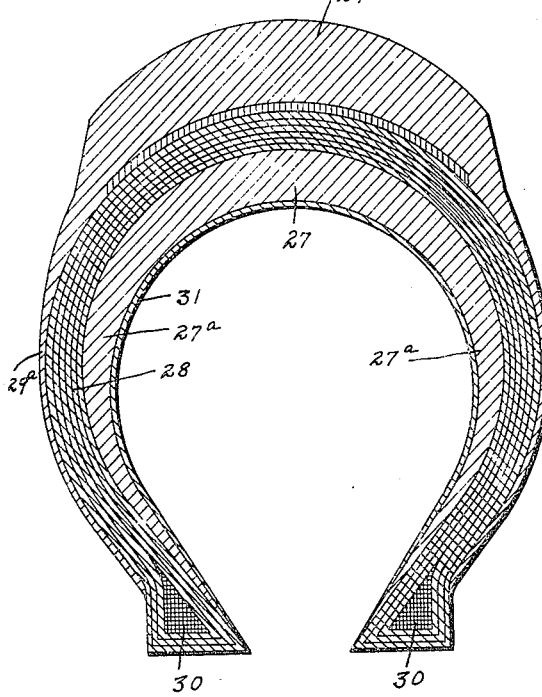
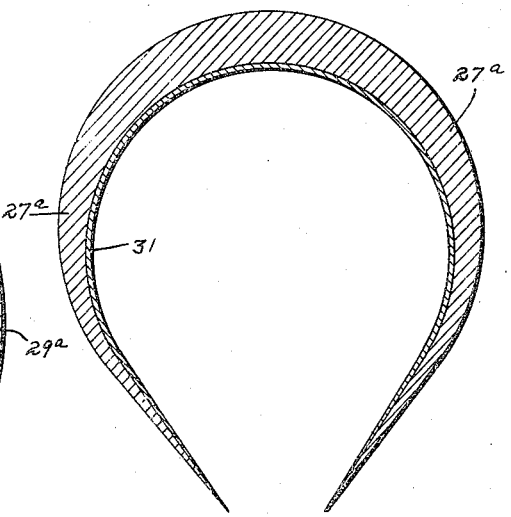

1,456,908

UNITED STATES PATENT OFFICE.

WILLIAM E. POWERS, OF BOSTON, AND MARTIN F. HANNIGAN, OF WATERTOWN, MASSACHUSETTS.

PNEUMATIC TIRE.

Application filed May 1, 1922. Serial No. 557,528.

*To all whom it may concern:*

Be it known that we, WILLIAM E. POWERS and MARTIN F. HANNIGAN, citizens of the United States, residing at Boston and Watertown, in the counties of Suffolk and Middlesex, respectively, and State of Massachusetts, have invented new and useful Improvements in Pneumatic Tires, of which the following is a specification.

This invention relates to the outer element or shoe of a pneumatic tire which includes a resilient inner element, such as an inflatable inner tube enclosed in the shoe, the edges of the shoe being beaded and adapted to be interlocked with securing means on a wheel rim.

The chief object of the invention is to provide a shoe of improved construction, eliminating liability of rim-cuts and blow-outs, and reducing to a minimum liability of sufficiently puncturing the tread portion of the shoe to rupture the inner tube.

The invention is embodied in the improvements hereinafter described and claimed.

Of the accompanying drawings forming a part of this specification,—

Figure 1 is a transverse sectional view of the shoe member, called the inner tread.

Figure 2 is a transverse sectional view showing one form of the entire shoe.

Figure 3 represents a sectional view of an inner tread formed as an accessory of an ordinary shoe.

Figure 4 is a sectional view showing the tread shown by Figure 3, in an ordinary shoe.

The same reference characters indicate the same parts in all of the figures.

In the embodiment shown by Figures 1 and 2 our improved shoe comprises laminated portions of fibrous material, composed either of sheets of textile fabric, or cords, or a combination of these, the fibrous material being frictioned as usual, so that the elements thereof may be united by vulcanization. The said portions form a laminated fibrous inner facing or carcass 12, a laminated fibrous outer facing or carcass 13, said facings being spaced apart, and laminated fibrous necks 14, connecting the edge portions of the facings, and forming therewith pockets containing the beads 15. The beads may be of any suitable material or materials, their form in cross section conforming to the confining means on the wheel rim, and the major portions of their external surfaces being adapted to be united by vulcanization to the casings and the necks. The beads are provided with abutment faces 16, extending (preferably obliquely) across the space between the inner and outer facings.

The shoe comprises also an inner tread made of a rubber composition, having the characteristics hereinafter described, and occupying the space between the facings 12 and 13. The said inner tread has a relatively thick central portion or zone 17, and side portions 17ª, extending from the central portion to the beads, and preferably decreasing gradually in thickness from the central portion to the edges. The side portions are provided with edge faces 18, which conform to, and are abutted against, the bead faces 16.

The shoe also comprises an outer tread, made of a relatively soft rubber composition which, when vulcanized, has the degree of resilience usually possessed by the tread of a tire shoe. The outer tread has a relatively thick central portion 19, and side portions 19ª, covering the side portions of the outer facing 13, and gradually reduced in thickness from the central portion to the beaded edge portions.

The inner tread is molded and vulcanized separately, before it is incorporated in the shoe. The rubber composition of which the inner tread is made, is characterized by the fact that it contains a greater percentage of stiffening or hardening ingredients, such as sulphur and lime, than the composition of which the outer tread is made. After the inner tread is molded, it is vulcanized to semi-hardness, so that although it has a limited degree of flexibility and resilience, it is considerably harder, and less flexible and resilient than the outer tread, its hardness being such that it is adapted to better resist penetration by an instrumentality which may penetrate the outer tread.

The facings 12 and 13, the necks 14, and the outer tread, are prepared for vulcanization before the parts are assembled, and are vulcanized afterward. The final vulcanizing operation unites the outer and inner facings to the inner tread and to the beads, and unites the outer tread to the outer facing, and to a breaker strip 20, interposed between the central portions of the outer tread and the outer facing, said strip being at the same time united to the outer facing.

The semi-hardness of the inner tread not only minimizes liability of puncturing said tread, and an inner tube within the shoe, but also eliminates all liability of rim-cuts and blow-outs. The side portions 17ª of the inner tread constitutes relatively stiff struts, which extend to the beads and are supported by the bearing of the edge faces 18 on the abutment faces 16 of the beads. The side portions 17ª are not sufficiently flexible to enable them to be abruptly bent or buckled sidewise, but are sufficiently flexble to enable them to cooperate with the resilient outer tread in imparting the desired riding qualities to the tire.

Figures 3 and 4 show an inner tread, the central portion 27, and side portions 27ª of which are formed externally to be inserted in a shoe of ordinary construction, and composed, for example, of a laminated facing or carcass 28, and an outer tread of resilient rubber, composed of a central portion 29, and side portions 29ª, the edges of the shoe being provided with beads 30.

The inner tread is made of the same composition, and has the same characteristics as the inner tread shown by Figures 1 and 2, and may be cemented to the inner surface of the facing 28 of an existing shoe, either before or after the shoe has been used. In this case the inner tread is an attachment, or accessory, which may be cemented to the internal surface of an ordinary shoe, and interposed between the inner surface of the latter and the inner tube. The application of the inner tread to a shoe as last described, will involve a reduction of the inner tube-containing space, and the employment of a smaller inner tube. To prevent the objectionable friction and heat which would be developed by direct contact between the rubber inner tread and the rubber inner tube, we provide the inner surface of the inner tread with an inner facing 31, of rubberized fabric, which contacts directly with the inner tube.

The inner tread having the described characteristics, constitutes a new article of manufacture, which may be incorporated in a shoe as a structural part during the manufacture thereof, or may be added to a complete shoe.

We claim:

1. A pneumatic tire comprising an inner tread of rubber separately molded and vulcanized to semi-hardness, and including side portions extending to the edge portions of the tire, a fibrous outer facing secured to the outer surface of the inner tread, and an outer tread of relatively soft rubber secured to the outer surface of the outer facing, the semi-hardness of the inner tread providing exemption from rim cuts and blow outs, and minimizing liability of puncture of the inner tread and of an enclosed inner tube.

2. A pneumatic tire comprising an inner tread of rubber separately molded and vulcanized to semi-hardness, and including side portions extending to the edge portions of the tire, a fibrous inner facing secured to the inner surface of the inner tread, a fibrous outer facing secured to the outer surface of the inner tread, and an outer tread of relatively soft rubber secured to the outer surface of the outer facing, the semi-hardness of the inner tread providing exemption from rim cuts and blow outs, and minimizing liability of puncture of the inner tread and of an enclosed inner tube.

3. A pneumatic tire comprising a laminated inner casing, a laminated outer casing, spaced from the inner casing, laminated necks connecting the edge portions of said casings, and forming therewith bead-containing pockets, beads occupying said pockets and having abutment faces extending across the space between said casings, an inner tread of semi-hard rubber interposed between said casings, and including side portions extending to said beads, the side portions having edge faces seated on said abutment faces, and an outer tread of relatively soft rubber covering the outer casing, the inner tread being separately molded and vulcanized to semi-hardness, and the said casings and outer tread being vulcanized on the inner tread, so that the casings are united to the beads, the beads are united to the inner tread, and the outer tread is united to the outer casing, by vulcanization, the semi-hardness of the inner tread providing exemption from rim cuts and blow-outs, and minimizing liability of puncture of the inner tread and of an enclosed inner tube.

4. As an article of manufacture, an inner tread constituting a member of a tire shoe, and made of a semi-hard rubber composition molded and vulcanized, and formed to be interposed between an inner tube and the external surface of the shoe, said inner tread being provided with a facing of textile fabric secured to its inner surface.

In testimony whereof we have affixed our signatures.

WILLIAM E. POWERS.
MARTIN F. HANNIGAN.